(12) United States Patent
Dan-Jumbo et al.

(10) Patent No.: US 9,314,979 B1
(45) Date of Patent: Apr. 19, 2016

(54) TRAPEZOIDAL REWORK PATCH

(71) Applicant: The Boeing Company, Chicago, IL (US)

(72) Inventors: Eugene A. Dan-Jumbo, Bothell, WA (US); Russell Lee Keller, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 206 days.

(21) Appl. No.: 13/943,124

(22) Filed: Jul. 16, 2013

(51) Int. Cl.
B29C 73/10 (2006.01)
B32B 7/14 (2006.01)
B32B 43/00 (2006.01)

(52) U.S. Cl.
CPC . B29C 73/10 (2013.01); B32B 7/14 (2013.01); B32B 43/00 (2013.01); *B32B 2250/44* (2013.01); *Y10T 428/20* (2015.01)

(58) Field of Classification Search
None
See application file for complete search history.

(56) References Cited

U.S. PATENT DOCUMENTS

| | | | |
|---|---|---|---|
| 5,972,141 A * | 10/1999 | Ellyin | 428/63 |
| 8,409,384 B2 | 4/2013 | Dan-Jumbo et al. | |
| 8,449,703 B2 | 5/2013 | Dan-Jumbo et al. | |
| 2003/0188821 A1 * | 10/2003 | Keller et al. | 156/94 |
| 2010/0227117 A1 | 9/2010 | Dan-Jumbo et al. | |
| 2010/0233424 A1 | 9/2010 | Dan-Jumbo et al. | |
| 2011/0177309 A1 * | 7/2011 | Dan-Jumbo | B29C 73/10 428/212 |

OTHER PUBLICATIONS

Dan-Jumbo et al., "Bonded Patch Having Multiple Zones of Fracture Toughness," U.S. Appl. No. 12/706,799, filed Feb. 17, 2010, 56 pages.
Dan-Jumbo et al., "Predictable Bonded Rework of Composite Structures Using Tailored Patches," U.S. Appl. No. 13/902,816, filed May 26, 2013, 55 pages.
Dan-Jumbo et al., "Tapered Patch for Predictable Bonded Rework of Composite Structures," U.S. Appl. No. 13/902,855, filed May 27, 2013, 49 pages.
Dan-Jumbo et al., "Discretely Tailored Multi-Zone Bondline for Fail-Safe Structural Repair," U.S. Appl. No. 12/903,489, filed Oct. 13, 2010, 53 pages.

* cited by examiner

*Primary Examiner* — David Sample
*Assistant Examiner* — Donald M Flores, Jr.
(74) *Attorney, Agent, or Firm* — Yee & Associates, P.C.

(57) ABSTRACT

A composite rework patch and method. The composite rework patch comprises a trapezoidal shape, a first region, and a second region. The trapezoidal has a first base and a second base, the first base parallel to the second base. The first region comprises a first composite material portion and a first adhesive portion. The second region comprises a second composite material portion and a second adhesive portion.

21 Claims, 9 Drawing Sheets

TRAPEZOIDAL REWORK PATCH

BACKGROUND INFORMATION

1. Field

The present disclosure relates generally to rework operations. More particularly, the present disclosure relates to a composite rework patch for use in rework operations.

2. Background

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

Structures may have localized areas containing one or more inconsistencies. These inconsistencies may undesirably influence properties of the structure such that the structure does not perform as desired. Reworking the areas having the inconsistencies may improve the properties and performance of the structure.

Conventionally, a rework may be performed using a patch placed over the inconsistency in the area and secured to the structure using mechanical fasteners. However, the use of fasteners may increase aircraft weight. Additionally, the use of fasteners may increase drag on the aircraft and may be aesthetically undesirable in some applications. Further, the use of fasteners may result in an increase in stress concentrations throughout the reworked area. The increase in stress concentrations may require more maintenance than desired.

Therefore, it would be desirable to have a method and apparatus that takes into account at least some of the issues discussed above, as well as other possible issues.

SUMMARY

In an illustrative embodiment, a composite rework patch is provided. The composite rework patch comprises a trapezoidal shape, a first region, and a second region. The trapezoidal shape has a first base and a second base. The first base is parallel to the second base. The first region comprises a first composite material portion and a first adhesive portion. The second region comprises a second composite material portion and a second adhesive portion.

In another illustrative embodiment, a method is provided. A composite rework patch is fabricated, the composite rework patch comprising a plurality of regions. The composite rework patch has a trapezoidal shape. The trapezoidal shape comprises a first base, a second base, and two sides. The composite rework patch is adhered over an inconsistency in a structure.

In yet another illustrative embodiment, a system is provided. The system comprises a structure having an inconsistency and a composite patch placed in a location over the inconsistency. The composite rework patch comprises a trapezoidal shape, a first region, and a second region. The trapezoidal shape has a first base and a second base. The first base is parallel to the second base. The first region comprises a first composite material portion and a first adhesive portion. The second region comprises a second composite material portion and a second adhesive portion.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. For example, the illustrative embodiments recognize and take into account that the Federal Aviation Administration (FAA) airworthiness and sustainment requirements provide guidance on certifying composite bonded structures. This guidance includes provisions such as redundant load paths, the ability to inspect bond structural strength, or arrestment features. The illustrative embodiments recognize and take into account that currently, there is not a certified entirely bonded composite rework method designed to arrest, or substantially arrest, growth of an inconsistency.

The different illustrative embodiments recognize and take into account that a geometry of a rework patch may influence the functioning of the rework patch. In other words, the geometry may affect the properties of the rework patch when installed.

The different illustrative embodiments also recognize and take into account that a position of a rework patch relative to a structure also may influence the performance of the rework patch when installed. Specifically, the position of a rework patch relative to a structure may influence a distribution of loads by the rework patch. Further, the position of a rework patch relative to a structure may influence suppressing or arresting growth of the inconsistency. As used herein, a position of a rework patch includes the location and orientation of the rework patch relative to the structure.

Yet further, the illustrative embodiments recognize and take into account that the geometry of a rework patch and the properties of a plurality of regions of the rework patch may work together to produce desirable results. For example, the geometry of a rework patch and properties of a plurality of regions of the rework patch may work together to arrest or substantially reduce growth of an inconsistency. Specifically, the geometry of a rework patch and properties of a plurality of regions of the rework patch may work together to reduce a strain energy release rate at an inconsistency. Additionally, the illustrative embodiments recognize and take into account that the geometry of a rework patch and properties of a plurality of regions of the rework patch may work together to localize or prevent disbonding of the composite rework patch.

Figure 1:
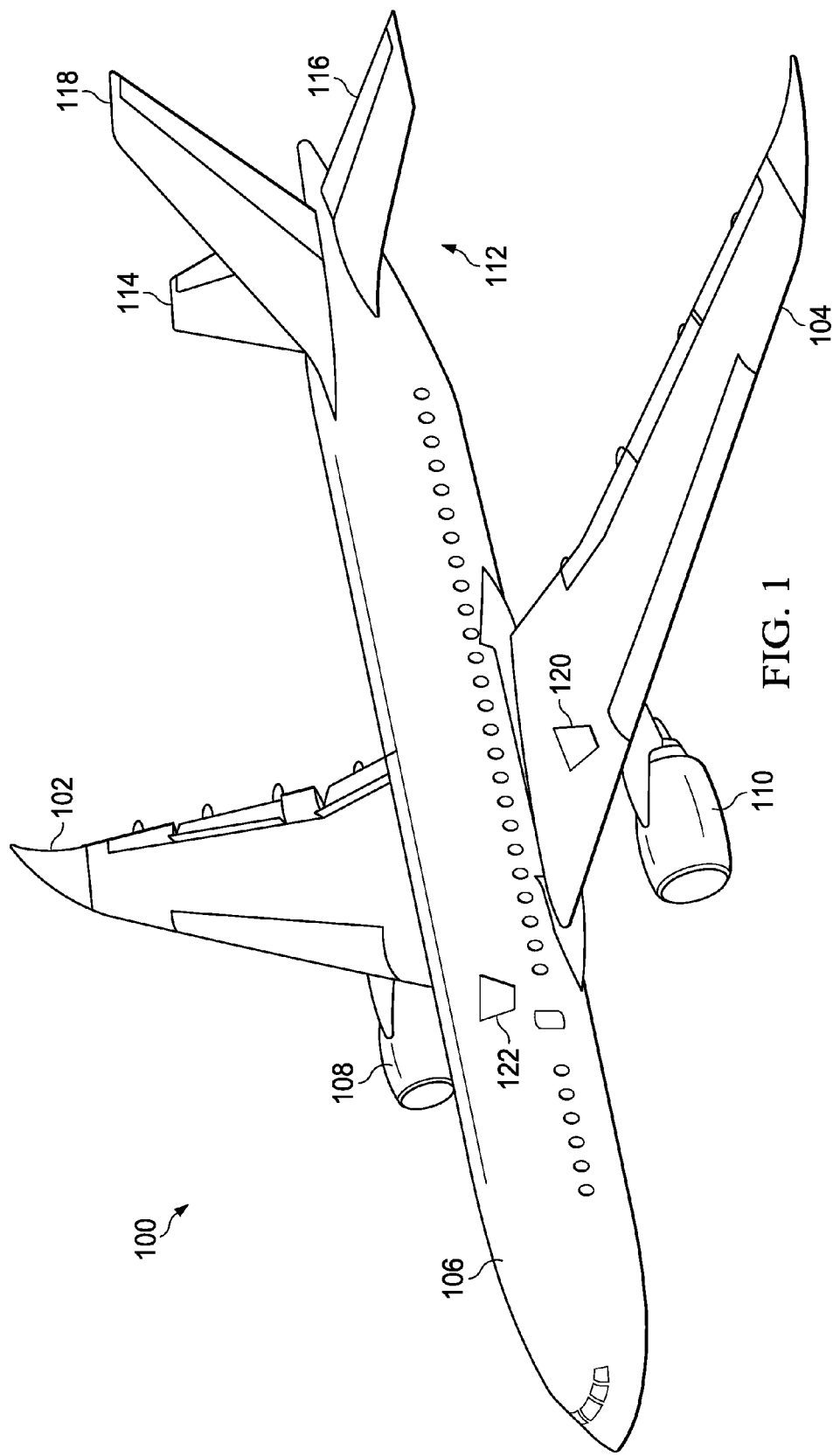
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which rework patches may be implemented in accordance with an illustrative embodiment. For example, rework patch 120 is attached to wing 104. Rework patch 120 may comprise a plurality of regions, each comprising a composite material. As depicted, rework patch 120 has a trapezoidal shape having a first base and a second base. Rework patch 120 is placed in an orientation such that the first base and the second base are perpendicular to an inboard and outboard load path within wing 104. However, in some illustrative examples, rework patch 120 may be placed in an orientation such that the first base and the second base are perpendicular to a different selected load path within wing 104.

Additionally, rework patch 122 is attached to body 106. Rework patch 122 may comprise a plurality of regions, each comprising a composite material. As depicted, rework patch 122 has a trapezoidal shape having a first base and a second base. Rework patch 122 is placed such that the first base and the second base are perpendicular to a hoop load path within body 106. However, in some illustrative examples, rework patch 120 may be placed in an orientation such that the first base and the second base are perpendicular to a different selected load path within body 106.

As depicted, rework patch 120 and rework patch 122 are about the same size and have about the same dimensions. Specifically, the first base of rework patch 120 and the first base of rework patch 122 are about the same length. Further, the second base of rework patch 120 and the second base of rework patch 122 are about the same length. However, in some illustrative examples, rework patch 120 and rework patch 122 may have different dimensions. Specifically, rework patch 120 may be configured to have dimensions desirable for providing a rework for wing 104. Further, rework patch 122 may be configured to have dimensions desirable for providing a rework for body 106.

As depicted, aircraft 100 has two rework patches, rework patch 120 and rework patch 122, which are attached to wing 104 and body 106 of aircraft 100. In some other illustrative examples, aircraft 100 may have a smaller or larger number of rework patches. Further, rework patch 120 and rework patch 122 may be placed in other locations on aircraft 100. In one illustrative example, rework patch 120 may be placed on tail section 112 of aircraft 100.

The illustration of aircraft 100 in FIG. 1 is not meant to imply physical or architectural limitations to the manner in which an illustrative embodiment may be implemented. For example, although aircraft 100 is a commercial aircraft, aircraft 100 may be a military aircraft, a rotorcraft, helicopter, unmanned aerial vehicle, or any other suitable aircraft.

Aircraft 100 may be made from a variety of different materials. In some illustrative examples, the skin of wing 102, wing 104, or body 106 may be made from a metal such as aluminum. In other illustrative examples, the skin of wing 102, wing 104, or body 106 may be made from a composite material. Although rework patch 120 and rework patch 122 comprise composite material, rework patch 120 and rework patch 122 may be used on aircraft 100 comprising a metal or a composite material.

Although the illustrative examples for an illustrative embodiment are described with respect to an aircraft, the illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
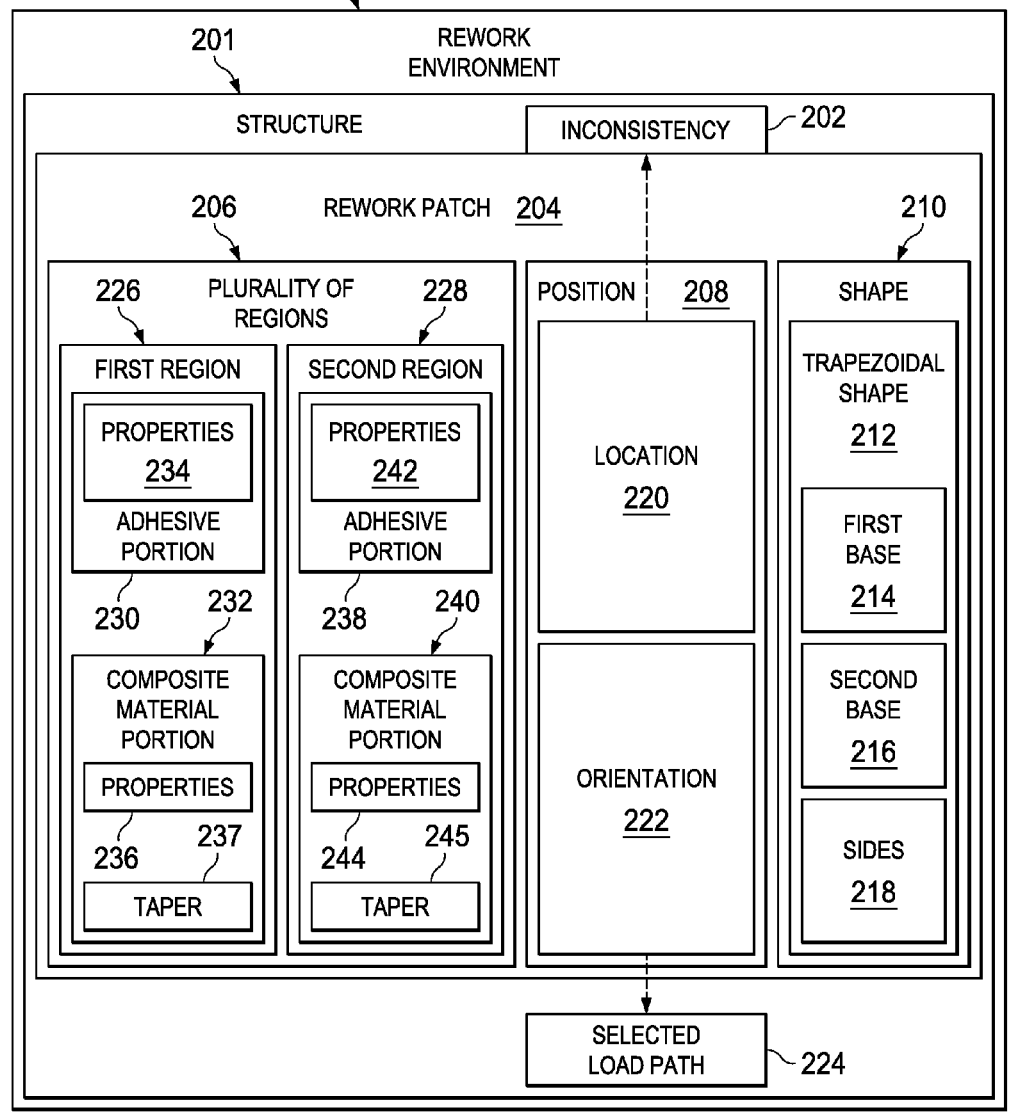
FIG. 2 is an illustration of a block diagram of a rework environment in accordance with an illustrative embodiment.

Turning now to FIG. 2, an illustration of a block diagram of a rework environment is depicted in accordance with an illustrative embodiment. In this illustrative example, rework environment 200 in FIG. 2 is depicted in block form to illustrate different components for one or more illustrative embodiments. In this depicted example, rework environment 200 includes structure 201. Structure 201 may be an aircraft such as aircraft 100 of FIG. 1. Structure 201 may include one or more materials. For example, structure 201 may comprise at least one of a composite material, metal, metallic alloy, or any other suitable material.

As used herein, the phrase "at least one of," when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

As depicted, structure 201 has inconsistency 202. Inconsistency 202 is an undesirable feature in an area of structure 201 that may require rework. Inconsistency 202 may be a crack, embedded particle, variation in thickness, area of undesirable moisture content, impurity, delamination, or any other undesirable feature. In some illustrative examples, inconsistency 202 may result in an undesirable performance in structure 201. At least one of interlaminar stresses, stress intensity, or strain energy release rate along the edge of inconsistency 202 may drive a growth of inconsistency 202. Specifically, stress intensity along the edge of inconsistency 202 may drive a growth of inconsistency 202 if structure 201 comprises metal. Strain energy release rate along the edge of inconsistency 202 may drive a growth of inconsistency 202 if structure 201 comprises a composite material.

Interlaminar stresses are out of plane forces. As used herein, "out of plane forces" refers to forces which are not in the plane of the object. For example, loads perpendicular to the surface of a fuselage are out of plane loads. As used herein, "stress intensity" is a stress at a point due to pressure resulting from combined tension stresses and compression stresses. The combined tension stresses and compression stresses may be remote or residual stresses.

As used herein, "strain energy release rate" is a measure of energy dissipated by growth of an inconsistency per unit of growth of inconsistency. Strain energy release rate may also be described as a gradient of the strain energy release over the inconsistency length.

Rework patch 204 is associated with structure 201. Rework patch 204 may be used to rework structure 201. Rework patch 204 may be placed over a portion of structure 201. Specifically, in some illustrative examples, rework patch 204 is configured to be placed over inconsistency 202 to arrest or substantially arrest growth of inconsistency 202 and carry a load through structure 201. Rework patch 204 may carry a load which structure 201 may be unable to carry due to inconsistency 202.

In this illustrative example, rework patch 204 comprises plurality of regions 206, position 208, and shape 210. Shape 210 may contribute to transferring loads from structure 201 near inconsistency 202. Specifically, shape 210 may transfer loads from structure 201 without changing a load path undesirably. Rework patch 204 may bridge loads across inconsistency 202 as well as transfer loads out of inconsistency 202.

Transfer of loads and stresses by rework patch 204 may be changed by changing shape 210. Shape 210 may work together with at least one of material properties of adhesive or material properties of composite material within rework patch 204. Shape 210 may work together with at least one of material properties of adhesive portions or composite material portions in plurality of regions 206 of rework patch 204.

Specifically, shape 210 may work together with at least one of material properties of adhesive or material properties of composite material within rework patch 204 to provide rework patch 204 with desired rework behavior. In one illustrative example, shape 210 may work together with at least one of material properties of adhesive or material properties of composite material within rework patch 204 to provide rework patch 204 with a desired load distribution.

In the illustrative example, shape 210 is trapezoidal shape 212. With trapezoidal shape 212, rework patch 204 may be lighter or less expensive. For example, with trapezoidal shape 212, rework patch 204 may have a smaller surface area and therefore use less material as compared to if rework patch 204 has shape 210 that is a square or a circle.

Further, trapezoidal shape 212 may react to more complex loads than rework patch 204 having shape 210 that is a circle. Specifically, trapezoidal shape 212 may react desirably to global loads and outside loads as well as loads related to inconsistency 202.

For example, trapezoidal shape 212 has first base 214, second base 216, and sides 218. In the illustrative example, the size of first base 214 may be tailored to provide desirable properties for rework patch 204. In this illustrative example, first base 214 is parallel to second base 216. Each of sides 218 is between first base 214 and second base 216. The size of second base 216 may be tailored to provide desirable properties for rework patch 204. Specifically, the ratio of the size of first base 214 relative to the size of second base 216 may be tailored to provide desirable properties for rework patch 204.

In one illustrative example, first base 214 may be the smaller base of rework patch 204. In this illustrative example, as the ratio of first base 214 over the second base 216 increases, a stress intensity of inconsistency 202 decreases. Specifically, a stress intensity along the edge of inconsistency 202 may decrease as the ratio of first base 214 to second base 216 increases.

In some illustrative examples a size of first base 214 and a size of second base 216 may be selected to significantly reduce a stress intensity of inconsistency 202. By reducing a stress intensity of inconsistency 202, growth of inconsistency 202 may be reduced, or substantially arrested.

In some illustrative examples, stress intensity may decrease by about 45% to about 75% in some areas of inconsistency 202. In some illustrative examples, stress intensity may be substantially zero in the center of inconsistency 202.

In one illustrative example, first base 214 may be the smaller base of rework patch 204. In this illustrative example, as the ratio of first base 214 over the second base 216 increases, a strain energy release rate at inconsistency 202 decreases. Specifically, a strain energy release rate along the edge of inconsistency 202 may decrease as the ratio of first base 214 to second base 216 increases.

In some illustrative examples, a size of first base 214 and a size of second base 216 may be selected to significantly reduce a strain energy release rate at inconsistency 202. By reducing a strain energy release rate at inconsistency 202, growth of inconsistency 202 may be reduced, or substantially arrested.

In some illustrative examples, strain energy release rate may decrease by about 45% to about 75% in some areas of inconsistency 202. In some illustrative examples, strain energy release rate may be substantially zero at the center of inconsistency 202.

Adjusting a ratio of first base 214 and second base 216 adjusts interlaminar stresses in an area of inconsistency 202 of structure 201. Specifically, as the ratio of the smaller of first base 214 and second base 216 and the larger of first base 214 and second base 216 increases, the interlaminar stresses at inconsistency 202 are reduced.

As described above, by selecting a different length for at least one of first base 214 or second base 216, properties of rework patch 204 may be changed. Further, by changing length of sides 218, properties of rework patch 204 may be changed.

Position 208 may also influence properties of rework patch 204 when installed. Position 208 of rework patch 204 comprises location 220 and orientation 222. Rework patch 204 is associated with inconsistency 202. Specifically, location 220 of rework patch 204 is over inconsistency 202 of structure 201. In some illustrative examples, a region of plurality of regions 206 may completely cover inconsistency 202.

Orientation 222 of rework patch 204 is associated with selected load path 224. Selected load path 224 is a direction of a selected load associated with structure 201. In some illustrative examples, selected load path 224 may be a hoop load path. In some illustrative examples, selected load path 224 may be an inboard outboard load path. In some illustrative examples, selected load path 224 may be a chordwise load path. In some illustrative examples, selected load path 224 may be a chordwise diagonal load path. As used herein, inboard outboard loads are loads within a wing that are directed towards or away from the body of an aircraft.

In some illustrative examples, rework patch 204 is placed in orientation 222 such that first base 214 and second base 216 are perpendicular to selected load path 224. Specifically, in some illustrative examples, rework patch 204 may be placed in orientation 222 such that first base 214 and second base 216 are perpendicular to a hoop load path. As used herein, hoop loads are forces exerted circumferentially in both directions on points in the body. In some illustrative examples, rework patch 204 may be placed in orientation 222 such that first base 214 and second base 216 are perpendicular to a chordwise load path. As used herein, chordwise loads are forces exerted within a wing of an aircraft in a straight direction joining the leading and trailing edges of the wing. In some other illustrative examples, rework patch 204 may be placed in orientation 222 such that first base 214 and second base 216 are perpendicular to a chordwise diagonal load path. As used herein, chordwise diagonal loads are forces rotated 45 degrees in-plane from chordwise loads in a wing of an aircraft. Accordingly, orientation 222 of rework patch 204 on structure 201 may be dependent on the type of load for selected load path 224.

By directing loads of selected load path 224 into the larger of first base 214 and second base 216, the loads of selected load path 224 may be distributed over a larger area. By distributing the loads of selected load path 224 across a larger area, rework patch 204 may substantially reduce these loads as they move through rework patch 204.

In this illustrative example, rework patch 204 comprises plurality of regions 206. As depicted, plurality of regions 206 comprises two or more regions. Plurality of regions 206 may comprise any desirable quantity of regions. A quantity of regions in plurality of regions 206 may be selected based on at least one of selected load path 224, loads of structure 201, material properties of adhesives and composite materials used in rework patch 204, inconsistency 202, or other suitable characteristics.

As depicted, plurality of regions 206 is concentric. Each of plurality of regions 206 has a different respective size than each other region in plurality of regions 206. When rework patch 204 has trapezoidal shape 212, each region of plurality of regions 206 may comprise a trapezoidal shape.

Each of plurality of regions 206 may have different material properties to selectively control at least one of the load introduction or the load transfer of rework patch 204. For example, each of plurality of regions 206 may have respective properties selected for at least one of interlaminar fracture toughness, elastic constant, shear stiffness, or bending rigidity. In some illustrative examples, each of plurality of regions 206 may have a different value for at least one of interlaminar fracture toughness, elastic constant, shear stiffness, and bending rigidity.

Further, plurality of regions 206 may work together to accomplish desirable results for rework patch 204. In one illustrative example, each region of plurality of regions 206 may have different respective interlaminar tensions which sum to substantially zero interlaminar tension for rework patch 204. In other words, in one illustrative example, a sum of interlaminar tensions of plurality of regions 206 is substantially zero. In another illustrative example, each region of plurality of regions 206 may have different respective interlaminar shears which progressively decrease moving towards the center of rework patch 204. Progressively decreasing interlaminar shears in plurality of regions 206 may substantially arrest growth of inconsistency 202.

As depicted, plurality of regions 206 comprises first region 226 and second region 228. First region 226 comprises adhesive portion 230 and composite material portion 232. In one illustrative example, first region 226 may comprise an innermost region of plurality of regions 206 in rework patch 204. In this illustrative example, first region 226 may be placed over inconsistency 202 to completely cover inconsistency 202.

First region 226 may comprise a trapezoidal shape. In some illustrative embodiments, a ratio of a smaller base of first region 226 and a larger base of first region 226 may be the same as the ratio of first base 214 and second base 216 of rework patch 204. In some illustrative embodiments, a ratio of a smaller base of first region 226 and a larger base of first region 226 may be different than the ratio of first base 214 and second base 216 of rework patch 204.

Adhesive portion 230 may comprise an adhesive between composite material portion 232 and structure 201. In some illustrative examples, adhesive portion 230 may have the same shape as composite material portion 232. Adhesive portion 230 may be at least one of a liquid adhesive, tape adhesive, or any other suitable type of adhesive.

Adhesive portion 230 has properties 234. Properties 234 may include mode I interlaminar fracture toughness, mode II interlaminar fracture toughness, or other suitable properties. As used herein, mode I interlaminar fracture toughness is toughness to tensile loads. As used herein, mode II interlaminar fracture toughness is toughness to shear loads. Properties 234 may be affected by adhesive type, adhesive chemistry, adhesive thickness, and other characteristics of adhesive portion 230.

Composite material portion 232 has properties 236. Properties 236 may include at least one of tensile modulus, strain elongation, interlaminar fracture toughness, or other suitable material properties. Properties 236 may be affected by fiber type, resin type, material thickness, fiber orientation, number of plies, and other characteristics of composite material portion 232.

In this illustrative example, properties 236 may be selected for composite material portion 232 so that rework patch 204 provides at least one of desirable load introduction or desirable load transfer. Properties 236 may be selected based on interaction of composite material portion 232 with adhesive portion 230. In some illustrative examples, properties 236 may be selected based on interaction of first region 226 with at least one of second region 228 or shape 210.

In some illustrative examples, composite material portion 232 comprises taper 237. Decreasing lengths of plies of composite material portion 232 may form taper 237. Taper 237 of composite material portion 232 may have an angle. The degree of difference in lengths of plies of composite material portion 232 influences the angle of taper 237. In other words, by changing the difference between the lengths of plies of composite material portion 232, the angle of taper 237 may be increased or decreased.

In this illustrative example, taper 237 may be formed in composite material portion 232 so that rework patch 204 provides at least one of desirable load introduction or desirable load transfer. An angle for taper 237 may be selected based on interaction of composite material portion 232 with adhesive portion 230. In some illustrative examples, an angle for taper 237 may be selected based on interaction of first region 226 with at least one of second region 228 or shape 210.

As depicted, second region 228 includes adhesive portion 238 and composite material portion 240. In one illustrative example, second region 228 may comprise an outermost region of plurality of regions 206 in rework patch 204.

Second region 228 may have a trapezoidal shape. In some illustrative embodiments, a ratio of a smaller base of second region 228 and a larger base of second region 228 may be the same as the ratio of first base 214 and second base 216 of rework patch 204. In other illustrative embodiments, a ratio of a smaller base of second region 228 and a larger base of second region 228 may be different than the ratio of first base 214 and second base 216 of rework patch 204.

Adhesive portion 238 may comprise an adhesive between composite material portion 240 and structure 201. In some illustrative examples, adhesive portion 238 may have the same shape as composite material portion 240. Adhesive portion may comprise a liquid adhesive, tape adhesive, or any other suitable type of adhesive.

Composite material portion 240 has properties 244. Properties 244 may include tensile modulus, strain elongation, interlaminar fracture toughness, or other suitable material properties. Properties 244 may be affected by fiber type, resin type, material thickness, fiber orientation, number of plies, and other characteristics of composite material portion 240. Properties 244 may be selected for composite material portion 240 so that rework patch 204 provides desirable load introduction. Properties 244 may be selected for composite material portion 240 so that rework patch 204 provides desirable load transfer. Properties 244 may be selected based on interaction of composite material portion 240 with adhesive portion 238. In some illustrative examples, properties 244 may be selected based on interaction of second region 228 with at least one of first region 226 or shape 210.

In some illustrative examples, composite material portion 240 comprises taper 245. Decreasing lengths of plies of composite material portion 240 may form taper 245. Taper 245 of composite material portion 240 may have an angle. The degree of difference in lengths of plies of composite material portion 240 influences the angle of taper 245. In other words, by changing the difference between the lengths of plies of composite material portion 240, the angle of taper 245 may be increased or decreased.

In this illustrative example, taper 245 may be formed in composite material portion 240 so that rework patch 204 provides at least one of desirable load introduction or desirable load transfer. An angle for taper 245 may be selected based on interaction of composite material portion 240 with adhesive portion 238. In some illustrative examples, an angle for taper 245 may be selected based on interaction of second region 228 with at least one of first region 226 or shape 210.

Adhesive portion 238 has properties 242. Properties 242 may include mode I interlaminar fracture toughness, mode II interlaminar fracture toughness, or other suitable properties. Properties 242 may be affected by adhesive type, adhesive chemistry, adhesive thickness, and other characteristics of adhesive portion 238.

As rework patch 204 comprises composite material portion 232 and composite material portion 240, rework patch 204 may also be referred to herein as a composite rework patch. Further, when rework patch 204 has trapezoidal shape 212, rework patch 204 may also be referred to as a trapezoidal rework patch.

Shape 210, first region 226, and second region 228 of rework patch 204 may work together to produce desirable results. In some illustrative examples, trapezoidal shape 212, properties of first region 226, and properties of second region 228 work together to arrest growth of inconsistency 202. Further, in some illustrative examples, trapezoidal shape 212, properties of first region 226, and properties of second region 228 work together to reduce loads on rework patch 204. Still further in some illustrative examples, trapezoidal shape 212, properties of first region 226, and properties of second region 228 work together to prevent disbonding of rework patch 204. Still yet further in other illustrative examples, trapezoidal shape 212, properties of first region 226, and properties of second region 228 work together to account for bending. As used herein, bending results from loads applied perpendicularly to a longitudinal axis of structure 201. Yet further in other illustrative examples, trapezoidal shape 212, properties of first region 226, and properties of second region 228 work together to account for fatigue. Specifically, trapezoidal shape 212, properties of first region 226, and properties of second region 228 may work together to reduce fatigue load on inconsistency 202. Still yet further in other illustrative examples, trapezoidal shape 212, properties of first region 226, and properties of second region 228 work together to account for bending. Specifically, trapezoidal shape 212, properties of first region 226, and properties of second region 228 work together to react to bending to redistribute the load into rework patch 204.

Properties of first region 226 may comprise at least one of properties 234 and properties 236 of first region 226. Properties of second region 228 may comprise at least one of properties 242 and properties 244 of second region 228.

Rework patch 204 of FIG. 2 may be configured to desirably transfer loads and stresses. Rework patch 204 may desirably transfer loads and stresses by minimizing and distributing the loads. Specifically, rework patch 204 of FIG. 2 may be configured to redistribute both static and cyclic loads. Static loads may include tension, compression, shear loads, torsional loads, bending, or any other forces applied to structure 201. Cyclic loads may include fatigue loads or any load due to repeated force applied to structure 201.

The illustration of rework environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of regions 206 may comprise any desirable quantity of regions. In one illustrative example, plurality of regions 206 may further comprise a third region and a fourth region. In this illustrative example, the third region and the fourth region may each have respective adhesive portions and composite material portions, each with their own properties.

Figure 3:
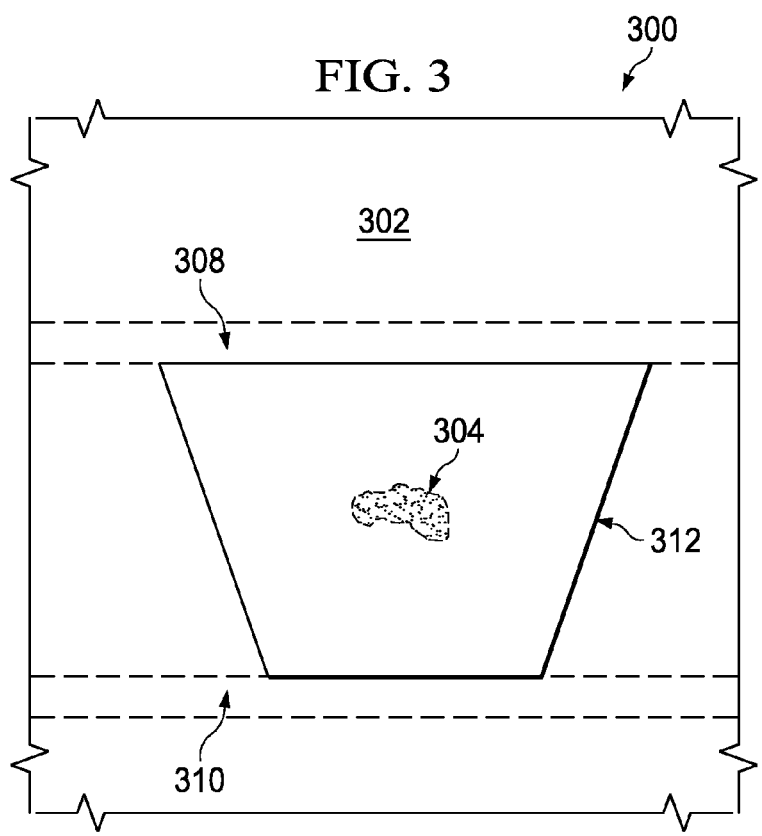
FIG. 3 is an illustration of a top view of a position for a trapezoidal rework patch on a structure in accordance with an illustrative embodiment.

Turning now to FIG. 3, an illustration of a top view of a position for a trapezoidal rework patch on a structure is depicted in accordance with an illustrative embodiment. Rework environment 300 is an example of a physical implementation of rework environment 200 of FIG. 2. Structure 302 is an example of a physical implementation of structure 201 of FIG. 2. Inconsistency 304 is an example of a physical implementation of inconsistency 202 of FIG. 2.

As depicted, inconsistency 304 of structure 302 is placed between structural support 308 and structural support 310. As depicted, inconsistency 304 comprises debris. However, in other illustrative examples, inconsistency 304 may be a crack, variation in thickness, area of undesirable moisture content, impurity, disbonding in composite materials of structure 302, or any other undesirable feature.

Structure 302 may be a body of an aircraft such as body 106 of aircraft 100 of FIG. 1. Outline 312 may be an outline of a position for a rework patch. The position for the rework patch may be selected based on loads of structure 302. Outline 312 may be representative of position 208 of FIG. 2. A rework patch may be designed to rework inconsistency 304 of structure 302. Specifically, the size of rework patch, the number of regions within the rework patch, and the material properties of each region of the rework patch may be designed for rework of inconsistency 304. The expected loads and stresses within structure 302, the size of inconsistency 304, the material of structure 302, and other factors may be taken into account when designing a rework patch.

FIG. 3 is not meant to imply physical or architectural limitations to the manner in which an illustrative embodiment may be implemented. Other components in addition to or in place of the ones illustrated may be used. Some components may be unnecessary.

For example, additional inconsistencies or different types of inconsistencies than debris may be present in structure 302. As another example, inconsistency 304 may be in a different location than between structural support 308 and structural support 310. Further, a rework patch may not be placed in a different location than within outline 312. The expected loads and stresses within structure 302 and other factors may be taken into account when positioning a rework patch.

Figure 4:
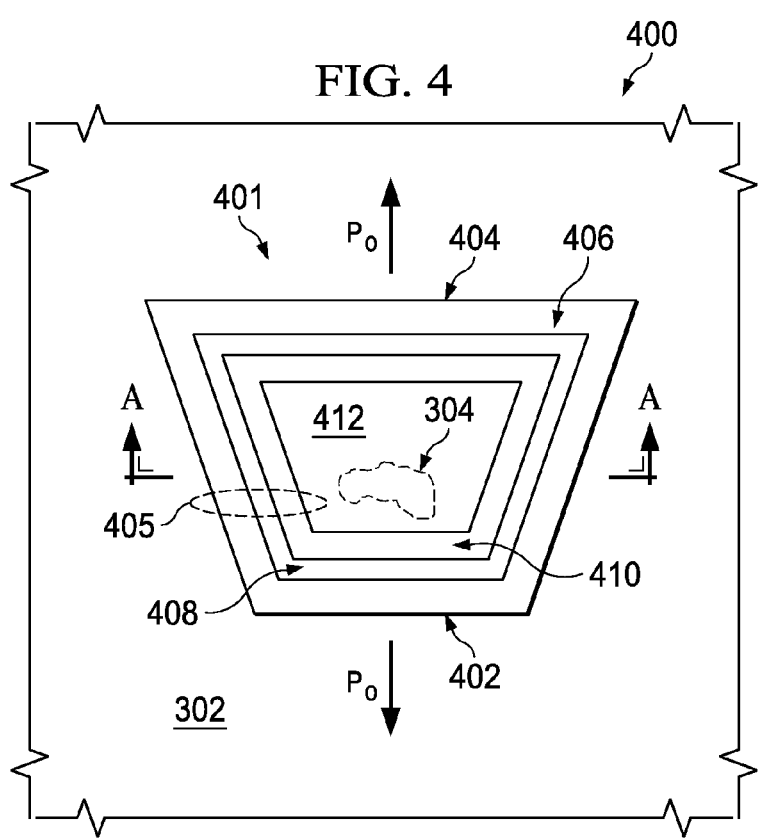
FIG. 4 is an illustration of a top view of a plan of a trapezoidal rework patch on a structure in accordance with an illustrative embodiment.

Turning now to FIG. 4, an illustration of a top view of a plan of a trapezoidal rework patch on a structure is depicted in accordance with an illustrative embodiment. Rework 400 is an example of a physical implementation of rework environment 200 in FIG. 2. Rework patch 401 on structure 302 is an example of a physical implementation of rework patch 204 on structure 201 shown in block form in FIG. 2. Rework patch 401 may be designed for rework of inconsistency 304 of structure 302.

Rework patch 401 is placed over inconsistency 304 of structure 302. Rework patch 401 has first base 402 and second base 404. First base 402 and second base 404 are placed relative to structure 302 such that a selected load path is perpendicular to first base 402 and second base 404. As depicted, first base 402 and second base 404 are placed relative to structure 302 such that hoop load paths $P_o$, are perpendicular to first base 402 and second base 404.

Although in this illustrative example, the selected load path is a hoop load path $P_o$, selected load paths may be selected from at least one of chordwise load paths, chordwise diagonal load paths, inboard outboard load paths, or any other desired selected load path. Accordingly, the orientation of rework patch 401 on structure 302 may be dependent on the type of load in a selected load path.

Rework patch 401 comprises plurality of regions 405. In this illustrative example, plurality of regions 405 has a quantity of four regions. Plurality of regions 405 comprises first region 406, second region 408, third region 410, and fourth region 412.

First region 406 of rework patch 401 may be referred to as a subcritical inconsistency growth region. In first region 406, growth initiation of inconsistency 304 is resisted. First region 406 may have different material properties than the remaining regions in plurality of regions 405. As the outermost region, first region 406 provides a desirable transition of loads from structure 302 to rework patch 401. Composite material in first region 406 of rework patch 401 may have the lowest tensile modulus of plurality of regions 405. Further adhesive in first region 406 of rework patch 401 may have the least amount of toughness of plurality of regions 405.

Second region 408 of rework patch 401 may be referred to as a controlled inconsistency growth region. Second region 408 provides resistance to growth of inconsistency 304. Composite material in second region 408 has a tensile modulus selected to control loads within second region 408. Adhesive in second region 408 of rework patch 401 decreases the rate of load transfer and strain energy release rate from the edge of inconsistency 304 into rework patch 401.

Third region 410 may be referred to as a fatigue stable inconsistency growth region. Third region 410 manages load distribution and, thus, diminishes the mean load effects on rework patch 401. Adhesive within third region 410 of rework patch 401 diminishes the amount of load transfer and strain energy release rate into rework patch 401. As a result, extension of inconsistency 304 may be arrested or suppressed.

Fourth region 412 may be referred to as an inconsistency arrestment region. Fourth region 412 may substantially stop growth of inconsistency 304. Composite material within fourth region 412 may have the highest value of at least one of tensile modulus, strain elongation, and interlaminar fracture toughness to provide the greatest tolerance to inconsistency 304. Adhesive within fourth region 412 provides both mode I interlaminar fracture toughness and mode II interlaminar fracture toughness to offer resistance to stresses from inconsistency 304.

FIG. 4 is not meant to imply physical or architectural limitations to the manner in which an illustrative embodiment may be implemented. Other components in addition to or in place of the ones illustrated may be used. Some components may be unnecessary.

For example, additional inconsistencies or different types of inconsistencies than debris may be present in structure 302. Further, rework patch 401 may comprise any desirable number of regions in plurality of regions 405. In one illustrative example, rework patch 401 may comprise three regions.

Figure 5:
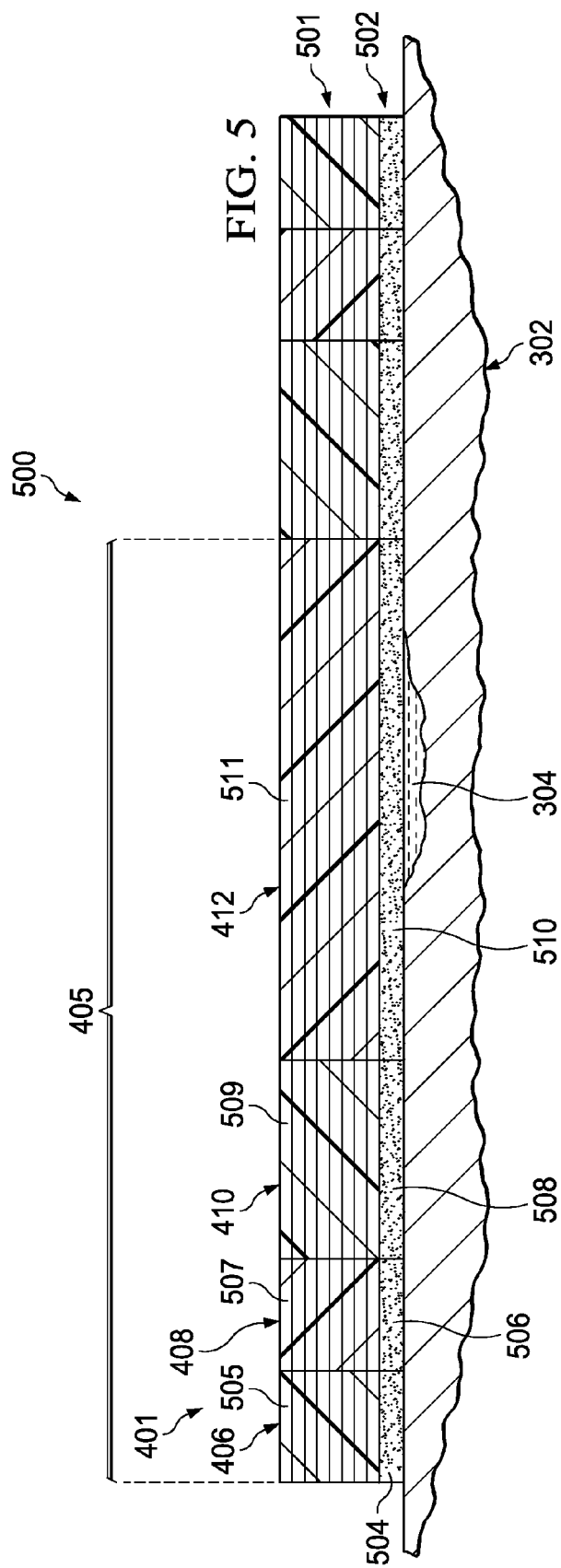
FIG. 5 is an illustration of a cross-sectional view of a trapezoidal rework patch on a structure in accordance with an illustrative embodiment.

Turning now to FIG. 5, an illustration of a cross-sectional view of a trapezoidal rework patch on a structure is depicted in accordance with an illustrative embodiment. Specifically, FIG. 5 may be a view along line A-A of FIG. 4. As depicted, rework patch 401 in rework environment 500 is a physical implementation of rework patch 204 shown in block form in FIG. 2.

Rework patch 401 is placed over inconsistency 304 of structure 302. Rework patch 401 comprises plurality of regions 405. In this illustrative example, plurality of regions 405 has four regions. Plurality of regions 405 comprises first region 406, second region 408, third region 410, and fourth region 412. Each of plurality of regions 405 has a respective composite material portion forming plurality of composite material portions 501. Each of plurality of regions 405 has a respective adhesive portion, forming plurality of adhesive portions 502.

In first region 406, growth initiation of inconsistency 304 is resisted. First region 406 comprises adhesive portion 504 and composite material portion 505. Adhesive portion 504 is placed between composite material portion 505 and structure 302. Adhesive portion 504 has material properties selected based on at least one of inconsistency 304, structure 302, position of adhesive portion 504 within rework patch 401, or other suitable parameters. In some illustrative examples, adhesive portion 504 may have mode I interlaminar fracture toughness of about 5.0 in-lb/in$^2$ to about 6.5 in-lb/in$^2$.

Composite material portion 505 comprises a plurality of plies. In one illustrative example, the tensile modulus of composite material portion 505 of first region 406 may be about 25 MSI to about 28 MSI. The tensile modulus is a measurement of stiffness of a material. As used herein, MSI represents million pounds per square inch. In this illustrative example, composite material portion 505 may have a strain elongation of about 1.3% to about 1.5%. In this illustrative example, composite material portion 505 may have a mode I interlaminar fracture toughness of about 2.5 in-lb/in$^2$ to about 4.0 in-lb/in$^2$.

Specific ranges of properties may be obtained in composite material portion 505 by fiber type, resin type, fiber orientation, number of plies, ply orientation, and other suitable parameters of composite material portion 505. By varying parameters of composite material portion 505, desirable material properties may be obtained for a specific inconsistency or structure.

Shape of first region 406, properties of adhesive portion 504, and properties of composite material portion 505 may work together to provide desirable behavior for first region 406. Behavior of first region 406 may work together with second region 408, third region 410, and fourth region 412 as well as the shape of rework patch 401 to provide desirable behavior for rework patch 401 as a whole.

Second region 408 provides resistance to growth of inconsistency 304. Second region 408 comprises adhesive portion 506 and composite material portion 507.

Adhesive portion 506 is placed between composite material portion 507 and structure 302. Adhesive portion 506 may have material properties selected based on inconsistency 304, structure 302, position of adhesive portion 506 within rework patch 401, or other suitable parameters. In some illustrative examples, adhesive portion 506 may have mode I interlaminar fracture toughness of about 7.0 in-lb/in$^2$ to about 8.5 in-lb/in$^2$. Adhesive portion 506 decreases the rate of load and strain energy release rate at the inconsistency edge to the rework patch.

Composite material portion 507 comprises a plurality of plies. In one illustrative example, the tensile modulus of composite material portion 507 of second region 408 may be about 28 MSI to about 31 MSI.

In this illustrative example, composite material portion 507 may have a strain elongation of about 1.5% to about 1.8%. In this illustrative example, composite material portion 507 may have a mode I interlaminar fracture toughness of about 3.5 in-lb/in$^2$ to about 4.5 in-lb/in$^2$.

Specific ranges of properties may be obtained in composite material portion 507 by fiber type, resin type, fiber orientation, number of plies, ply orientation, and other suitable parameters of composite material portion 507. By varying parameters of composite material portion 507, desirable material properties may be obtained for a specific inconsistency or structure.

Shape of second region 408, properties of adhesive portion 506, and properties of composite material portion 507 may work together to provide desirable behavior for second region 408. Behavior of second region 408 may work together with first region 406, third region 410, and fourth region 412 as well as shape of rework patch 401 to provide desirable behavior for rework patch 401 as a whole.

Third region 410 may be referred to as a fatigue stable inconsistency growth region as third region 410 may have properties selected to address fatigue loads. Third region 410 may distribute the adhesive loads, thus diminishing the mean load effects on rework patch 401. Third region 410 comprises adhesive portion 508 and composite material portion 509. Adhesive portion 508 is placed between composite material portion 509 and structure 302. Adhesive portion 508 may have material properties selected based on inconsistency 304, structure 302, position of adhesive portion 508 within rework patch 401, or other suitable parameters.

In some illustrative examples, adhesive portion 508 may have mode I interlaminar fracture toughness of about 9.0 in-lb/in$^2$ to about 11.0 in-lb/in$^2$ and mode II interlaminar fracture toughness of about 18.0 in-lb/in$^2$ to about 22.0 in-lb/in$^2$. The presence of mode I and mode II interlaminar fracture toughness further diminishes the amount of inconsistency edge load transfer strain energy release rate into the patch. This results in suppression of extension of inconsistency 304 in structure 302.

Composite material portion 509 comprises a plurality of plies. In one illustrative example, the tensile modulus of composite material portion 509 of third region 410 may be about 32 MSI to about 35 MSI. In this illustrative example, composite material portion 509 may have a strain elongation of about 2.0% to about 2.5%. In this illustrative example, composite material portion 509 may have a mode I interlaminar fracture toughness of about 4.5 in-lb/in$^2$ to about 5.5 in-lb/in$^2$.

Specific ranges of properties may be obtained in composite material portion 509 by fiber type, resin type, fiber orientation, number of plies, ply orientation, and other suitable parameters of composite material portion 509. By varying parameters of composite material portion 509, desirable material properties may be obtained for a specific inconsistency or structure.

Shape of third region 410, properties of adhesive portion 508, and properties of composite material portion 509 may work together to provide desirable behavior for third region 410. Behavior of third region 410 may work together with first region 406, second region 408, and fourth region 412 as well as shape of rework patch 401 to provide desirable behavior for rework patch 401 as a whole.

Fourth region 412 may substantially stop growth of inconsistency 304. Fourth region 412 comprises adhesive portion 510 and composite material portion 511. Adhesive portion 510 is placed between composite material portion 511 and structure 302. Adhesive portion 508 may have material properties selected based on inconsistency 304, structure 302, position of adhesive portion 510 within rework patch 401, or other suitable parameters. In some illustrative examples, adhesive portion 510 may have mode I interlaminar fracture toughness of about 11.0 in-lb/in$^2$ to about 13.0 in-lb/in$^2$ and mode II interlaminar fracture toughness of about 22.0 in-lb/in$^2$ to about 26.0 in-lb/in$^2$.

Composite material portion 511 comprises a plurality of plies. In one illustrative example, the tensile modulus of composite material portion 511 of fourth region 412 may be about 35 MSI to about 38 MSI. In this illustrative example, composite material portion 511 may have a strain elongation of about 4.0% to about 4.5%. In this illustrative example, composite material portion 511 may have a mode I interlaminar fracture toughness of about 5.5 in-lb/in$^2$ to about 6.5 in-lb/in$^2$.

Specific ranges of properties may be obtained in composite material portion 511 by fiber type, resin type, fiber orientation, number of plies, ply orientation, and other suitable parameters of composite material portion 511. By varying parameters of composite material portion 511, desirable material properties may be obtained for a specific inconsistency or structure.

Shape of fourth region 412, properties of adhesive portion 510, and properties of composite material portion 511 may work together to provide desirable behavior for fourth region 412. Behavior of fourth region 412 may work together with first region 406, second region 408, and third region 410, as well as shape of rework patch 401 to provide desirable behavior for rework patch 401 as a whole.

Figure 6:
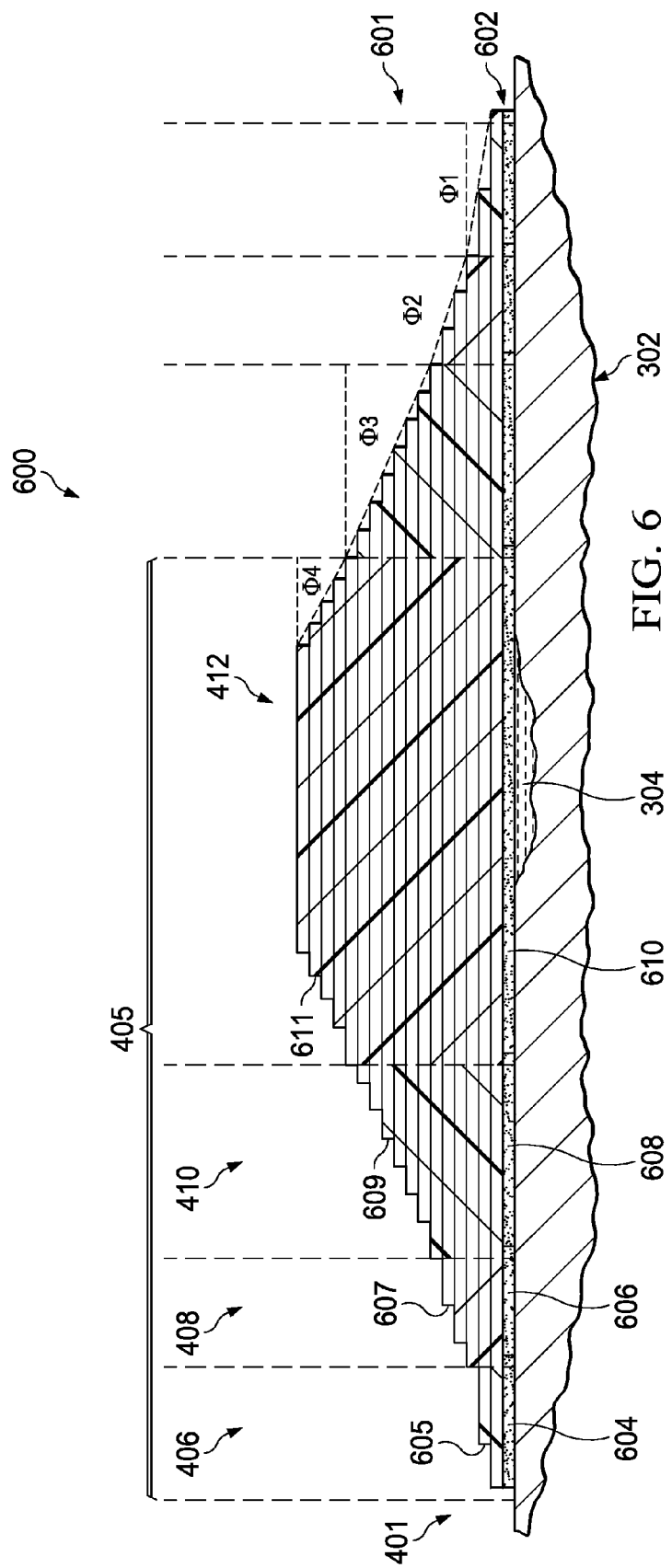
FIG. 6 is an illustration of a cross-sectional view of a trapezoidal rework patch having a plurality of tapered regions on a structure in accordance with an illustrative embodiment.

Turning now to FIG. 6, an illustration of a cross-sectional view of a trapezoidal rework patch with a plurality of tapered regions on a structure is depicted in accordance with an illustrative embodiment. Specifically, FIG. 6 may be a view along line A-A of FIG. 4. As depicted, rework patch 401 in rework environment 600 is a physical implementation of rework patch 204 shown in block form in FIG. 2.

Rework patch 401 is placed over inconsistency 304 of structure 302. Rework patch comprises plurality of regions 405. In this illustrative example, plurality of regions 405 has four regions. Plurality of regions 405 comprises first region 406, second region 408, third region 410, and fourth region 412. Each of plurality of regions 405 has a respective composite material portion forming plurality of composite material portions 601. Each of plurality of regions 405 has a respective adhesive portion, forming plurality of adhesive portions 602.

In first region 406, growth initiation of inconsistency 304 is resisted. First region 406 comprises adhesive portion 604 and composite material portion 605. Adhesive portion 604 is placed between composite material portion 605 and structure 302. Adhesive portion 604 has material properties selected based on at least one of inconsistency 304, structure 302, position of adhesive portion 604 within rework patch 401, or other suitable parameters. In some illustrative examples, adhesive portion 604 may have mode I interlaminar fracture toughness of about 5.0 in-lb/in$^2$ to about 6.5 in-lb/in$^2$.

Composite material portion 605 comprises a plurality of plies. As depicted, the plies in the plurality of plies have a variety of lengths. Although as depicted each ply has a different length, in some illustrative examples, not every ply of the plurality of plies may have a different length. As a result of the different lengths of the plurality of plies, composite material portion 605 has a taper. Specifically, composite material portion 605 has a taper having angle $\Phi 1$. Angle $\Phi 1$ may affect properties of rework patch 401. Specifically, angle $\Phi 1$ may affect at least one of load introduction or load transfer of rework patch 401.

As depicted, angle $\Phi 2$ of second region 408, angle $\Phi 3$ of third region 410, and angle $\Phi 4$ of fourth region 412 are greater than angle $\Phi 1$, however in some illustrative examples, angle $\Phi 1$ may be greater than at least one of angle $\Phi 2$, angle $\Phi 3$, and angle $\Phi 4$. Further, although the taper of composite material portion 605 as depicted is stepped due to the length of each ply, in some illustrative examples the taper may instead be cut or scarfed such that the taper is smooth.

In one illustrative example, the tensile modulus of composite material portion 605 of first region 406 may be about 25 MSI to about 28 MSI. In this illustrative example, composite material portion 605 may have a strain elongation of about 1.3% to about 1.5%. In this illustrative example, composite material portion 605 may have a mode I interlaminar fracture toughness of about 2.5 in-lb/in$^2$ to about 4.0 in-lb/in$^2$.

Specific ranges of properties may be obtained in composite material portion 605 by fiber type, resin type, fiber orientation, number of plies, ply orientation, and other suitable parameters of composite material portion 605. By varying parameters of composite material portion 605, desirable material properties may be obtained for a specific inconsistency or structure.

Shape of first region 406, properties of adhesive portion 604, and properties of composite material portion 605 may work together to provide desirable behavior for first region 406. Behavior of first region 406 may work together with second region 408, third region 410, and fourth region 412 as well as the shape of rework patch 401 to provide desirable behavior for rework patch 401 as a whole.

Second region 408 provides resistance to growth of inconsistency 304. Second region 408 comprises adhesive portion 606 and composite material portion 607.

Adhesive portion 606 is placed between composite material portion 607 and structure 302. Adhesive portion 606 may have material properties selected based on inconsistency 304, structure 302, position of adhesive portion 606 within rework patch 401, or other suitable parameters. In some illustrative examples, adhesive portion 606 may have mode I interlaminar fracture toughness of about 7.0 in-lb/in$^2$ to about 8.5 in-lb/in$^2$. Adhesive portion 606 decreases the rate of load and strain energy release rate at the inconsistency edge to the rework patch.

Composite material portion 607 comprises a plurality of plies. As depicted, the plies in the plurality of plies have a variety of lengths. Although as depicted each ply has a different length, in some illustrative examples, not every ply of the plurality of plies may have a different length. As a result of the different lengths of the plurality of plies, composite material portion 607 has a taper. Specifically, composite material portion 607 has a taper having angle $\Phi 2$. Angle $\Phi 2$ may affect properties of rework patch 401. Specifically, angle $\Phi 2$ may affect at least one of load introduction or load transfer of rework patch 401.

As depicted, angle $\Phi 3$ of third region 410 and angle $\Phi 4$ of fourth region 412 are greater than angle $\Phi 2$, however in some illustrative examples, angle $\Phi 2$ may be greater than at least one of angle $\Phi 3$ and angle $\Phi 4$. Further, in some illustrative examples, in some illustrative examples, angle $\Phi 2$ may be smaller than angle $\Phi 1$. Yet further, although the taper of composite material portion 607 as depicted is stepped due to the length of each ply, in some illustrative examples the taper may instead be cut or scarfed such that the taper is smooth.

In one illustrative example, the tensile modulus of composite material portion 607 of second region 408 may be about 28 MSI to about 31 MSI. In this illustrative example, composite material portion 607 may have a strain elongation of about 1.5% to about 1.8%. In this illustrative example, composite material portion 607 may have a mode I interlaminar fracture toughness of about 3.5 in-lb/in$^2$ to about 4.5 in-lb/in$^2$.

Specific ranges of properties may be obtained in composite material portion 607 by fiber type, resin type, fiber orientation, number of plies, ply orientation, and other suitable parameters of composite material portion 607. By varying parameters of composite material portion 607, desirable material properties may be obtained for a specific inconsistency or structure.

Shape of second region 408, properties of adhesive portion 606, and properties of composite material portion 607 may work together to provide desirable behavior for second region 408. Behavior of second region 408 may work together with first region 406, third region 410, and fourth region 412 as well as shape of rework patch 401 to provide desirable behavior for rework patch 401 as a whole.

Third region 410 may be referred to as a fatigue stable inconsistency growth region as third region 410 may have properties selected to address fatigue loads. Third region 410 may distribute the adhesive loads, thus diminishing the mean load effects on rework patch 401. Third region 410 comprises adhesive portion 608 and composite material portion 609. Adhesive portion 608 is placed between composite material portion 609 and structure 302. Adhesive portion 608 may have material properties selected based on inconsistency 304, structure 302, position of adhesive portion 608 within rework patch 401, or other suitable parameters.

In some illustrative examples, adhesive portion 608 may have mode I interlaminar fracture toughness of about 9.0 in-lb/in² to about 11.0 in-lb/in² and mode II interlaminar fracture toughness of about 18.0 in-lb/in² to about 22.0 in-lb/in². The presence of mode I and mode II interlaminar fracture toughness further diminishes the amount of inconsistency edge load transfer strain energy release rate into the patch. This results in suppression of extension of inconsistency 304 in structure 302.

Composite material portion 609 comprises a plurality of plies. As depicted, the plies in the plurality of plies have a variety of lengths. Although as depicted each ply has a different length, in some illustrative examples, not every ply of the plurality of plies may have a different length. As a result of the different lengths of the plurality of plies, composite material portion 609 has a taper. Specifically, composite material portion 609 has a taper having angle Φ3. Angle Φ3 may affect properties of rework patch 401. Specifically, angle Φ3 may affect at least one of load introduction or load transfer of rework patch 401.

As depicted, angle Φ4 of fourth region 412 is greater than angle Φ3, however in some illustrative examples, angle Φ3 may be greater than angle Φ4. Further, in some illustrative examples, in some illustrative examples, angle Φ3 may be smaller than at least one of angle Φ1 and angle Φ2. Yet further, although the taper of composite material portion 609 as depicted is stepped due to the length of each ply, in some illustrative examples the taper may instead be cut or scarfed such that the taper is smooth.

In one illustrative example, the tensile modulus of composite material portion 609 of third region 410 may be about 32 MSI to about 35 MSI. In this illustrative example, composite material portion 609 may have a strain elongation of about 2.0% to about 2.5%. In this illustrative example, composite material portion 609 may have a mode I interlaminar fracture toughness of about 4.5 in-lb/in² to about 5.5 in-lb/in².

Specific ranges of properties may be obtained in composite material portion 609 by fiber type, resin type, fiber orientation, number of plies, ply orientation, and other suitable parameters of composite material portion 609. By varying parameters of composite material portion 609, desirable material properties may be obtained for a specific inconsistency or structure.

Shape of third region 410, properties of adhesive portion 608, and properties of composite material portion 609 may work together to provide desirable behavior for third region 410. Behavior of third region 410 may work together with first region 406, second region 408, and fourth region 412 as well as shape of rework patch 401 to provide desirable behavior for rework patch 401 as a whole.

Fourth region 412 may substantially stop growth of inconsistency 304. Fourth region 412 comprises adhesive portion 610 and composite material portion 611. Adhesive portion 610 is placed between composite material portion 611 and structure 302. Adhesive portion 608 may have material properties selected based on inconsistency 304, structure 302, position of adhesive portion 610 within rework patch 401, or other suitable parameters. In some illustrative examples, adhesive portion 610 may have mode I interlaminar fracture toughness of about 11.0 in-lb/in² to about 13.0 in-lb/in² and mode II interlaminar fracture toughness of about 22.0 in-lb/in² to about 26.0 in-lb/in².

Composite material portion 611 comprises a plurality of plies. As depicted, the plies in the plurality of plies have a variety of lengths. Although as depicted each ply has a different length, in some illustrative examples, not every ply of the plurality of plies may have a different length. As a result of the different lengths of the plurality of plies, composite material portion 611 has a taper. Specifically, composite material portion 611 has a taper having angle Φ4. Angle Φ4 may affect properties of rework patch 401. Specifically, angle Φ4 may affect at least one of load introduction or load transfer of rework patch 401.

As depicted, angle Φ4 is greater than angle Φ1 of first region 406, angle Φ2 of second region 408, and angle Φ3 of third region 410, however in some illustrative examples, angle Φ4 may be smaller than at least one of angle Φ1, angle Φ2, and angle Φ3. Yet further, although the taper of composite material portion 611 as depicted is stepped due to the length of each ply, in some illustrative examples the taper may instead be cut or scarfed such that the taper is smooth.

In one illustrative example, the tensile modulus of composite material portion 611 of fourth region 412 may be about 35 MSI to about 38 MSI. In this illustrative example, composite material portion 611 may have a strain elongation of about 4.0% to about 4.5%. In this illustrative example, composite material portion 611 may have a mode I interlaminar fracture toughness of about 5.5 in-lb/in² to about 6.5 in-lb/in².

Specific ranges of properties may be obtained in composite material portion 611 by fiber type, resin type, fiber orientation, number of plies, ply orientation, and other suitable parameters of composite material portion 611. By varying parameters of composite material portion 611, desirable material properties may be obtained for a specific inconsistency or structure.

Shape of fourth region 412, properties of adhesive portion 610, and properties of composite material portion 611 may work together to provide desirable behavior for fourth region 412. Behavior of fourth region 412 may work together with first region 406, second region 408, and third region 410, as well as shape of rework patch 401 to provide desirable behavior for rework patch 401 as a whole.

The different components shown in FIG. 1 and FIGS. 3-6 may be combined with components in FIG. 2, used with components in FIG. 2, or a combination of the two. Additionally, some of the components in FIG. 1 and FIGS. 3-6 may be illustrative examples of how components shown in block form in FIG. 2 can be implemented as physical structures.

Figure 7:
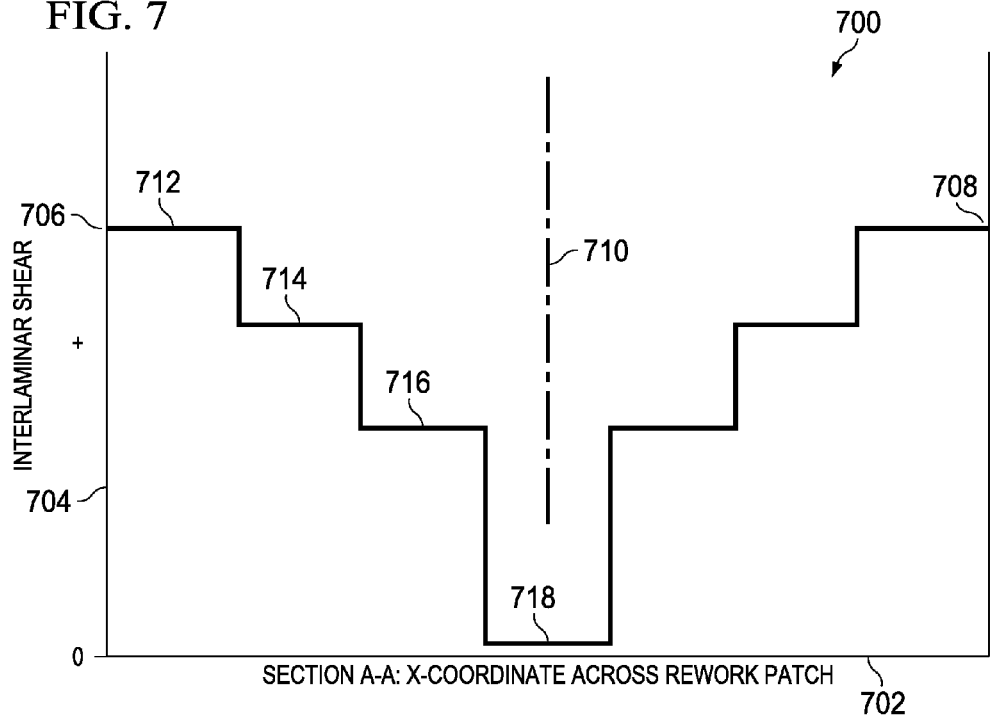
FIG. 7 is an illustration of a graph of interlaminar shear in a trapezoidal rework patch in accordance with an illustrative embodiment.

Turning now to FIG. 7, an illustration of a graph of interlaminar shear in a trapezoidal rework patch is depicted in accordance with an illustrative embodiment. Graph 700 may be an illustration of a graph of interlaminar tension in rework patch 204 of FIG. 2. Graph 700 may be an illustration of a graph of interlaminar tension in rework patch 401 on structure 302 in FIG. 4.

Graph 700 has x-axis 702 and y-axis 704. X-axis 702 represents a location within a cross-section of a rework patch. For example, x-axis 702 may represent points along cross-section A-A of rework patch 401 of FIG. 4. Y-axis 704 represents interlaminar shear in this illustrative example.

As depicted, point 706 represents a first edge of the rework patch within the cross-section. Point 708 represents a second edge of the rework patch within the cross-section. The second point is opposite of the first point. Centerline 710 is centered within the rework patch. In some illustrative examples, centerline 710 may be a centerpoint of an inconsistency.

As illustrated, the rework patch is divided into a plurality of regions. Specifically, the rework patch is divided into four regions. Although the depicted rework patch is divided into four regions, in some illustrative examples, a rework patch may have more or fewer than four regions. Measurement 712 represents the interlaminar shear measurement of a first region of the rework patch. As used herein, an "interlaminar shear measurement" is a measurement of a shearing force that may produce displacement between two plies in a composite along the plane of their interfaces. The first region is the outermost region of the rework patch. In one illustrative example, measurement 712 may be an interlaminar shear measurement of first region 406 of rework patch 401. As depicted, measurement 712 is the highest interlaminar shear.

Measurement 714 represents the interlaminar shear measurement of a second region of the rework patch. The second region is the next-to-outermost region of the rework patch. In one illustrative example, measurement 714 may be an interlaminar shear measurement of second region 408 of rework patch 401. As depicted, measurement 714 has a lower interlaminar shear than measurement 712.

Measurement 716 represents the interlaminar shear measurement of a third region of the rework patch. The third region is the next-to-innermost region of the rework patch. In one illustrative example, measurement 716 may be an interlaminar shear measurement of third region 410 of rework patch 401. As depicted, measurement 716 has a lower interlaminar shear than measurement 714 and measurement 712.

Measurement 718 represents the interlaminar shear measurement of a fourth region of the rework patch. The fourth region is the innermost region of the rework patch. In one illustrative example, measurement 718 may be an interlaminar shear measurement of fourth region 412 of rework patch 401. As depicted, measurement 718 is the lowest interlaminar shear measurement within the rework patch. In this illustrative example, measurement 718 is lower than measurement 712, measurement 714, and measurement 716. As depicted, measurement 718 is substantially zero.

Measurement 712, measurement 714, measurement 716, and measurement 718 decrease in substantially incremental steps moving inward from point 706 towards centerline 710. In other words, graph 700 is a substantially step-wise function. By measurement 712, measurement 714, measurement 716, and measurement 718 decreasing towards centerline 710, interlaminar stress above an inconsistency is substantially zero. Accordingly, the stress at the edge of the inconsistency is substantially reduced. In some illustrative examples, the stress at the edge of the inconsistency is substantially zero. Accordingly, the rework patch is able to substantially arrest growth of an inconsistency.

The illustration of graph 700 in FIG. 6 is not meant to imply physical or architectural limitations to the manner in which an illustrative embodiment may be implemented. Values for measurement 712, measurement 714, measurement 716, and measurement 718 may be tailored based on the properties of the plurality of regions of the rework patch. Specifically, values for measurement 712, measurement 714, measurement 716, and measurement 718 may be tailored based at least one of properties for respective composite portions and properties for respective adhesive portions of the plurality of regions of the rework patch.

Figure 8:
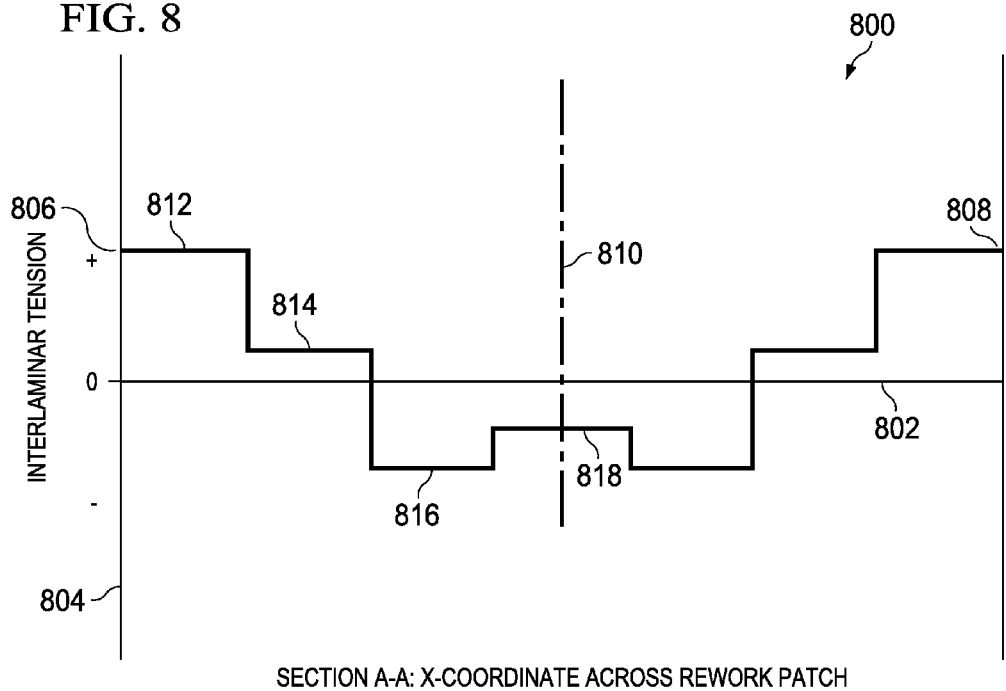
FIG. 8 is an illustration of a graph of interlaminar tension in a trapezoidal rework patch in accordance with an illustrative embodiment.

Turning now to FIG. 8, an illustration of a graph of interlaminar tension in a trapezoidal rework patch is depicted in accordance with an illustrative embodiment. Graph 800 may be an illustration of a graph of interlaminar tension in rework patch 204 of FIG. 2. Graph 800 may be an illustration of a graph of interlaminar tension in rework patch 401 on structure 302 in FIG. 4.

Graph 800 has x-axis 802 and y-axis 804. X-axis 802 represents a location within a cross-section of a rework patch. For example, axis 802 may represent points along cross-section A-A of rework patch 401 of FIG. 4. Y-axis 804 represents interlaminar tension.

Point 806 represents a first edge of the rework patch within the cross-section. Point 808 represents a second edge of the rework patch within the cross-section. The second point is opposite the first point. Centerline 810 is centered within the patch.

As illustrated, the rework patch is divided into a plurality of regions. Specifically, the rework patch is divided into four regions. Although the depicted rework patch is divided into four regions, in some illustrative examples, a rework patch may have more or fewer than four regions. Measurement 812 represents the interlaminar tension measurement of a first region of the rework patch. As used herein, an "interlaminar tension measurement" is a measurement of tension loads out of plane. The first region is the outermost region of the rework patch. In one illustrative example, measurement 812 may be an interlaminar tension measurement of first region 406 of rework patch 401. As depicted, measurement 812 is the most positive measurement.

Measurement 814 represents the interlaminar tension measurement of a second region of the rework patch. The second region is the next-to-outermost region of the rework patch. In one illustrative example, measurement 814 may be an interlaminar tension measurement of second region 408 of rework patch 401. As depicted, measurement 814 has a positive interlaminar tension. However, measurement 814 is lower than measurement 812.

Measurement 816 represents the interlaminar tension measurement of a third region of the rework patch. The third region is the next-to-innermost region of the rework patch. In one illustrative example, measurement 816 may be an interlaminar tension measurement of third region 410 of rework patch 401. As depicted, measurement 816 has the most negative interlaminar tension.

Measurement 818 represents the interlaminar tension measurement of a fourth region of the rework patch. The fourth region is the innermost region of the rework patch. In one illustrative example, measurement 818 may be an interlaminar tension measurement of fourth region 412 of rework patch 401. As depicted, measurement 818 is negative. Further, the value of measurement 818 is greater than the value of measurement 816. In other words, measurement 816 is more negative than measurement 818.

Measurement 812, measurement 814, measurement 816, and measurement 818 form substantially incremental steps. Measurement 812, measurement 814, measurement 816, and measurement 818 sum to substantially zero. By measurement 812, measurement 814, measurement 816, and measurement 818 summing to substantially zero, the interlaminar tension within the rework patch as a whole is substantially zero. Accordingly, the rework patch is able to arrest or substantially arrest growth of an inconsistency. Specifically, the tension and compression within the rework patch diminishes the effect of stresses on the edge of the inconsistency. Further, the rework patch is able to prevent disbond of the composite rework patch.

The illustration of graph 800 in FIG. 8 is not meant to imply physical or architectural limitations to the manner in which an illustrative embodiment may be implemented. Values for measurement 812, measurement 814, measurement 816, and measurement 818 may be tailored based on the properties of the plurality of regions of the rework patch. Specifically, values for measurement 812, measurement 814, measurement 816, and measurement 818 may be tailored based at least one of the properties for respective composite portions and the properties for respective adhesive portions of the plurality of regions of the rework patch.

Figure 9:
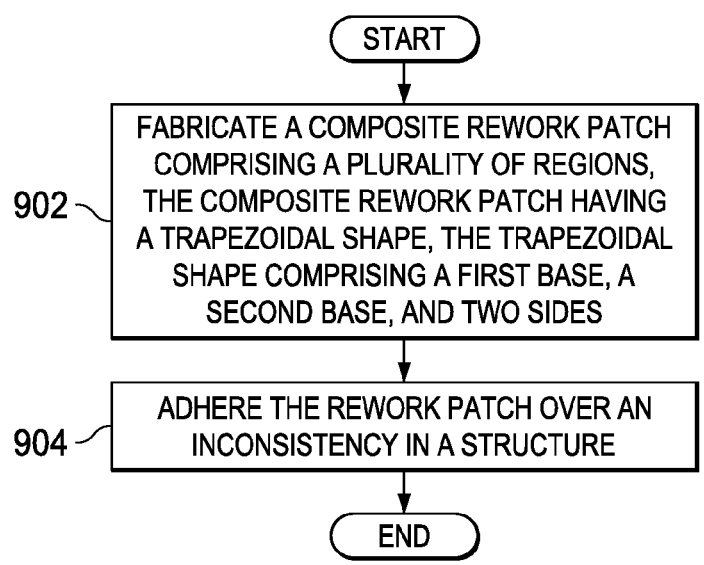
FIG. 9 is an illustration of a flowchart of a process for forming a trapezoidal rework patch in accordance with an illustrative embodiment.

Turning now to FIG. 9, an illustration of a flowchart of a process for forming a trapezoidal rework patch is depicted in accordance with an illustrative embodiment. The process illustrated in FIG. 9 may be implemented to form and use rework patch 204 of FIG. 2. Further, this process may be implemented to rework structure 201 for inconsistency 202 in FIG. 2.

The process begins by fabricating a composite rework patch comprising a plurality of regions, the composite rework patch having a trapezoidal shape, the trapezoidal shape comprising a first base, a second base, and two sides (operation 902.) The composite rework patch may be rework patch 204 having trapezoidal shape 212 of FIG. 2.

In one illustrative example, the composite rework patch may be rework patch 401 of FIG. 4. The composite rework patch may be designed to rework a structure having an inconsistency, such as structure 201 of FIG. 2. The process then adheres the rework patch over an inconsistency in a structure (operation 904.) The process terminates thereafter.

Figure 10:
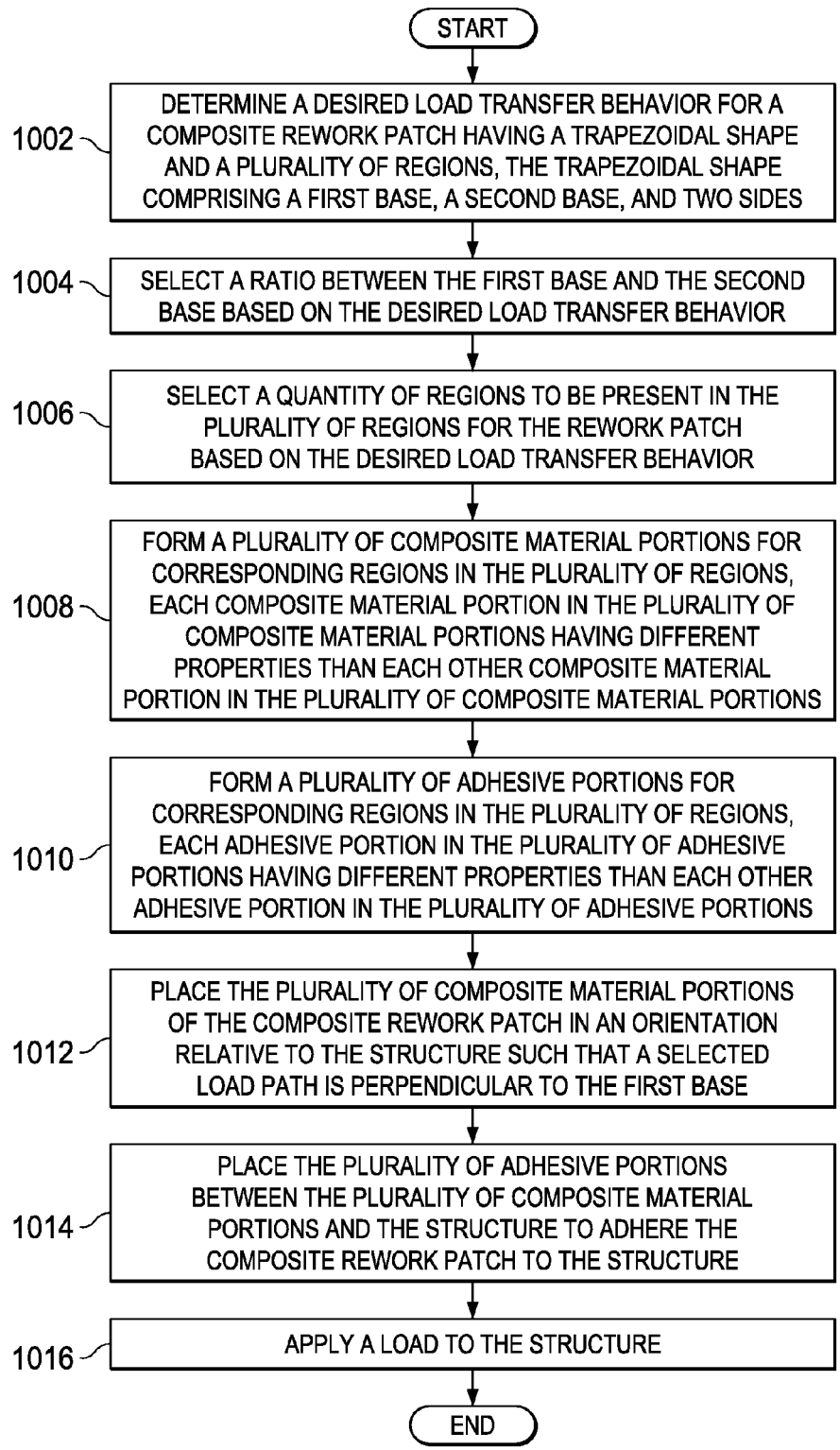
FIG. 10 is another illustration of a flowchart of a process for forming a trapezoidal rework patch in accordance with an illustrative embodiment.

Turning now to FIG. 10, another illustration of a flowchart of a process for forming a trapezoidal rework patch is depicted in accordance with an illustrative embodiment. The process illustrated in FIG. 10 may be implemented to form and use rework patch 204 of FIG. 2. Further, this process may be implemented to rework structure 201 for inconsistency 202 in FIG. 2.

The process begins by determining a desired load transfer behavior for a composite rework patch having a trapezoidal shape and a plurality of regions, the trapezoidal shape comprising a first base, a second base, and two sides (operation 1002). The composite rework patch may be rework patch 204 having trapezoidal shape 212 of FIG. 2. In another illustrative example, the composite rework patch may be rework patch 401 of FIG. 4. The composite rework patch may be designed to rework a structure having an inconsistency, such as structure 201 of FIG. 2. The desired load transfer behavior may be based on at least one of an inconsistency type, an inconsistency size, a position of the inconsistency on the structure, the material forming the structure, loads of the structure, or any other suitable rework parameter.

The process then selects a ratio between the first base and the second base based on the desired load transfer behavior (operation 1004). The ratio between the first base and the second base may affect the stress intensity of the inconsistency. Specifically, as the ratio of the smaller of the first base and the second base and the larger of the first base and the second base increases, the stress intensity at the edge of the inconsistency decreases. By decreasing the stress intensity, the rework patch may substantially arrest the growth of the inconsistency.

The ratio between the first base and the second base may affect the strain energy release rate at the inconsistency. Specifically, as the ratio of the smaller of the first base and the second base and the larger of the first base and the second base increases, the strain energy release rate at the edge of the inconsistency decreases. By decreasing the strain energy release rate, the rework patch may substantially arrest the growth of the inconsistency.

The process then selects a quantity of regions to be present in the plurality of regions for the rework patch based on the desired load transfer behavior (operation 1006). The plurality of regions may have any desired quantity of regions. In one illustrative example, plurality of regions may have two regions, such as, for example, first region 226 and second region 228 of FIG. 2. In another illustrative example, the plurality of regions may have four regions, such as, for example, plurality of regions 405 of FIG. 4.

The process then forms a plurality of composite material portions for corresponding regions in the plurality of regions, each composite material portion in the plurality of composite material portions having different properties than each other composite material portion in the plurality of composite material portions (operation 1008). The plurality of composite material portions may include composite material portion 232 and composite material portion 240 in FIG. 2.

The process then forms a plurality of adhesive portions for corresponding regions in the plurality of regions, each adhesive portion in the plurality of adhesive portions having different properties than each other adhesive portion in the plurality of adhesive portions (operation 1010). The plurality of composite material portions may include adhesive portion 230 and adhesive portion 238 of FIG. 2.

The process then places the plurality of composite material portions of the rework patch in an orientation relative to the structure such that a selected load path is perpendicular to the first base (operation 1012). The process then places the plurality of adhesive portions between the plurality of composite material portions and the structure to adhere the rework patch to the structure (operation 1014). The process then applies a load to the structure (operation 1016). The process terminates thereafter.

Figure 11:
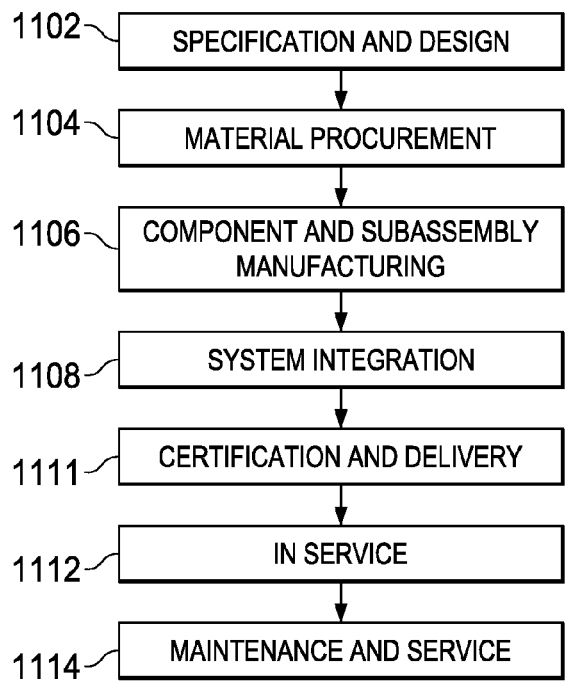
FIG. 11 is an illustration of an aircraft manufacturing and service method in the form of a block diagram in accordance with an illustrative embodiment.
Figure 12:
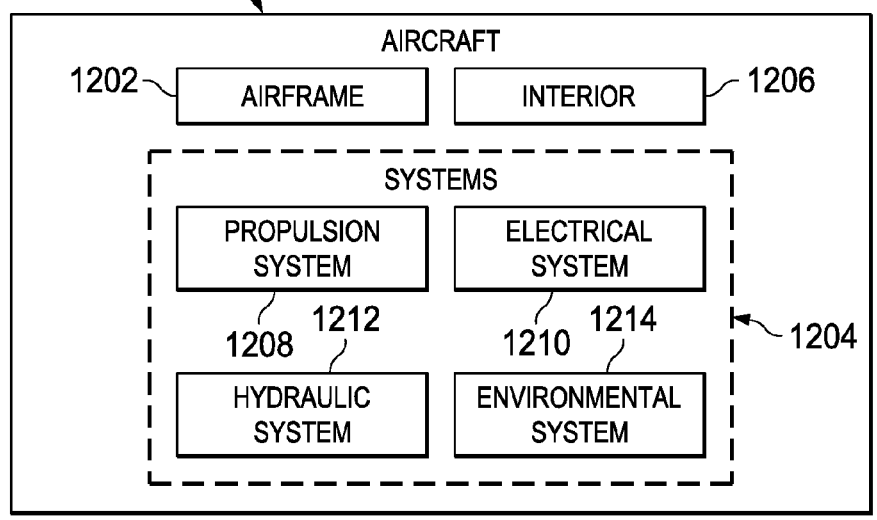
FIG. 12 is an illustration of an aircraft in the form of a block diagram in which an illustrative embodiment may be implemented.

The illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in the form of a block diagram in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in the form of a block diagram in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1100 in FIG. 11.

One or more illustrative embodiments may be used during component and subassembly manufacturing 1106. For example, rework patch 204 in FIG. 2 may be manufactured during component and subassembly manufacturing 1106. Further, rework patch 204 in FIG. 2 may be used to perform a rework of a structure during maintenance and service 1114. For example, an area on a wing of aircraft 1200 may be reworked using rework patch 204 during scheduled maintenance for aircraft 1200.

In one illustrative example, a method is provided. A desired load transfer behavior for a composite rework patch having a trapezoidal shape and a plurality of regions is determined. The trapezoidal shape comprises a first base, a second base, and two sides. A ratio between the first base and the second base is selected based on the desired load transfer behavior. A quantity of regions to be present in the plurality of regions for the composite rework patch is selected based on the desired load transfer behavior. A plurality of composite material portions for corresponding regions in the plurality of regions is formed. Each composite material portion in the plurality of composite material portions has different properties than each other composite material portion in the plurality of composite material portions. A plurality of adhesive portions for corresponding regions in the plurality of regions is formed. Each adhesive portion in the plurality of adhesive portions has different properties than each other adhesive portion in the plurality of adhesive portions. The plurality of composite material portions of the composite rework patch is placed in an orientation relative to the structure such that a selected load path is perpendicular to the first base. The plurality of adhesive portions is placed between the plurality of composite material portions and the structure to adhere the composite rework patch to the structure. A load is applied to the structure.

Current rework solutions include bolted rework patches. Bolted rework patches may result in a reworked structure with a reduced strength than the originally manufactured structure having no inconsistencies. The bolts through the structure may result in an inherent stress concentration. This inherent stress concentration may cause a reduction in local inconsistency tolerance capability in the reworked structure.

The trapezoidal rework patch of this illustrative embodiment provides a completely bonded rework patch. The rework patch contains a plurality regions. Each region has a respective composite portion and adhesive portion. Each region also may comprise uniquely designed and tailored, differential toughened interlaminar mixed modes fracture resistance properties which provide a substantial reduction in bonded rework interfacial stresses normally responsible for unzipping bonded rework structures inducing increasingly complex fracture mechanics mixed modes. Therefore the trapezoidal rework patch will enable structurally reliable and certifiable completely bonded rework structure patch per FAA FAR part 25, FAR part 26, and EASA requirements.

The trapezoidal composite rework patch may have multiple adhesive bonded regions. The trapezoidal composite rework patch may have a trapezoidal shape with structural adjustable bases. The geometry of the trapezoidal rework patch, in synchronism with the adhesive portions and composite portions of each region, mitigates adhesive and composite interface damaging stresses around an inconsistency in a fuselage or wing structure.

In some illustrative examples, the trapezoidal composite rework patch has four distinct structural regions. The properties of each region may be unique. The regions may function in an integrated manner to substantially reduce stresses in the inconsistency and substantially arrest growth of the inconsistency. The first region may be the outer region of the rework patch. This first region may be referred to as a subcritical inconsistency growth region in which inconsistency growth initiation is resisted. The next region, just inside the outer region, may be a controlled inconsistency growth region that provides additional resistance to inconsistency growth. Inside this region may be a fatigue stable inconsistency growth region. This third region is the fatigue stable inconsistency growth region that distributes the stresses within the adhesive, thus diminishing the mean stress effects on the patch. The fourth and innermost region is the inconsistency arrestment region. This region may also be referred to as an essentially no growth region. The integrated functioning of these regions may enable the global structure with the rework patch to meet FAA requirements beyond airframe limit loads. Each of the regions may have a uniquely tailored interlaminar fracture toughness with mixed modes for both the adhesive portions and the composite material portions. Each of the adhesive properties, composite material properties, number of regions, and ratio of bases may be selected or tailored specifically for each inconsistency to provide a rework patch that meets FAA requirements and provides a rework for the inconsistency.

In the rework patch design, each region may have different elastic moduli, and shear rigidity. Each region may also have a different ratio of the short base and long base of the trapezoidal shape of each region. The continuum mechanics design calculations may be based on the Nx, or skin/stringer running loads along each of the multiple inconsistencies to drastically reduce complex interfacial adhesive, multiple site inconsistencies, and structural skin stresses along the edges of the patch.

This reduction may diminish any induced boundary layer inconsistencies or discrete inconsistencies. Thus, the rework patch may provide a combined global and local inconsistency tolerance capability around any type of inconsistency rework, protecting against structural unzipping under critical airframe loads as maneuver loads, up and down bending, in-plane shear, torsional loads, lateral gusts, engine thrust loads, and especially large out of plane discrete engine burst inconsistency loads. The result of this trapezoidal composite rework patch design is a fail-safe integrated bonded composite design technology that provides multiple inconsistency retardation self-containment capability, inconsistency or delamination arrestment capability, and fatigue inconsistency propagation management capability.

The trapezoidal composite rework patch design contributes in reduction of the interlaminar singular out of plane peel stress, interlaminar shear stress and in-plane stresses at the inconsistency boundary surfaces, including the reduction of inconsistency tip forces, regardless of a hardpoint due to fuel access, thermal inconsistencies, and stiffness mismatches. This adjustable trapezoidal shape for a composite rework patch works in combination with distinct adhesive portions and separately designed composite portions, each with a unique structural functional ability to resist, mitigate, control, and stabilize inconsistency tip driving forces. The rework patch may minimize the effects of sigma Z stresses, tau XZ stresses, tau YZ stress and complex diagonal Qxy in-plane interfacial stresses and as such results in arresting extension of the inconsistency. This new patch rework design may meet airworthiness inconsistency tolerance rework specifications that can be certified through FAA requirements.

The high global peel, in-plane & shear adhesives bonded stresses between the rework patch and a structural skin with an inconsistency are substantially reduced due to the design of the rework patch. Specifically these stresses may be reduced because of the adjustable and tailorable structural geometrical features in combination with unique inconsistency tolerance abilities from structural properties. Thus, the rework patch may also provide a sustainable, durable, structurally effective patch design that is lighter than conventional bolted patches that meets airworthiness specifications. The rework patch design may receive credit for 100% bonded rework of primary structures for limit loads for FAA regulations, specifically for FAA FAR part 25 and FAR part 26.

The patch geometry is designed to complement the properties of the associated adhesive portions and composite portions. Because the geometry complements the properties of the adhesive portions and the composite portions, the inconsistency propagation threshold of the patch under global airframe loads is increased.

The innermost composite portion of the trapezoidal rework patch surrounds the inconsistency and is designed to arrest the inconsistency tips propagation global loads in conjunction with the geometry of the respective region. Thus, the properties of the innermost composite portion and the geometry of its respective region leads to a diminished inconsistency tip strain energy release rate, and arrestment or near arrestment of the inconsistency.

This innermost region may have the largest inconsistency tolerance capability to arrest an inconsistency in any direction and prevent any unzipping of the structurally integrated bonded trapezoidal rework patch. This inconsistency arrestment and containment capability is structurally effective because of the tailored geometry of the rework patch design which drastically reduces the surrounding stresses from the interactions between the three boundary elements: the structure having the inconsistency, the adhesive portions in a layer, and the composite portions in a layer. This discretized rework patch design provides the structural benefits by minimizing the resultant total strain energy at the inconsistency tips, thus redistributing the complex loads from flight loads to a wider structural area through the aircraft composite skin structure configuration.

The functional mechanics of the rework patch design may reduce weight, eliminate fasteners, eliminate corrosion, or increase fuel economy. This rework patch may also reduce a manufacturing cost. Specifically, the rework patch may reduce manufacturing costs as the rework patch may be a unitized patch.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite rework patch comprising:
a trapezoidal planform shape comprising a first base and a second base, the first base parallel to the second base;
a first region comprising a first composite material portion and a first adhesive portion, such that the first region comprises an innermost region of a plurality of regions; and
a second region comprising a second composite material portion and a second adhesive portion, such that the second region concentrically surrounds the first region and comprises a strain elongation value lower than a strain elongation value of the first region.

2. The composite rework patch of claim 1, wherein the first region is placed in a location over an inconsistency in a structure.

3. The composite rework patch of claim 2, wherein increasing a ratio of the second base to the first base decreases at least one of a stress intensity or a strain energy release rate at the inconsistency.

4. The composite rework patch of claim 2, further comprising properties of the trapezoidal shape, properties of the first region, and properties of the second region being each tailored to integrally arrest growth of the inconsistency.

5. The composite rework patch of claim 2, wherein the trapezoidal shape is placed in an orientation relative to the structure such that a selected load path is perpendicular to the first base.

6. The composite rework patch of claim 5, wherein the selected load path is a hoop load path of a body of an aircraft.

7. The composite rework patch of claim 5, wherein the selected load path is an inboard outboard load path of a wing of an aircraft.

8. The composite rework patch of claim 5, wherein the selected load path is a chordwise load path of a wing of an aircraft.

9. The composite rework patch of claim 1, wherein a sum of interlaminar tensions of the plurality of regions is substantially zero.

10. The composite rework patch of claim 1, wherein interlaminar shear of the first region is substantially zero.

11. The composite rework patch of claim 1, wherein the first composite material portion of the first region comprises a taper.

12. The composite rework patch of claim 1, further comprising properties of the trapezoidal shape, properties of the first region, and properties of the second region being each tailored to integrally prevent disbonding of the composite rework patch.

13. The composite rework patch of claim 1, further comprising a value for a tensile modulus for the second region comprises a lower value than a tensile modulus for the first region.

14. The composite rework patch of claim 1, further configured to arrest an extension of an inconsistency via a configuration tailored to: minimize effects of a sigma stress, a tau XZ stress, a tau YZ stress and a diagonal Qxy in-plane interfacial stress, such that the configuration comprises a value, that reduces progressively for each region located radially further from a center of the first region of the composite rework patch, of the plurality of regions, for a tensile modulus for each region.

15. A system that comprises:
a structure; and
a composite rework patch placed over a portion of the structure, in which the composite rework patch comprises a trapezoidal planform shape having a first base and a second base, the first base parallel to the second base; a first region that comprises a first composite material portion and a first adhesive portion such that the first region comprises an inner most region of a plurality of regions; and a second region comprising a second composite material portion and a second adhesive portion, such that the second region concentrically surrounds the first region and comprises a strain elongation value lower than a strain elongation value of the first region.

16. The system of claim 15, wherein the structure is an aircraft.

17. A rework patch configured to arrest an extension of an inconsistency via a configuration tailored to: minimize effects of a sigma stress, a tau XZ stress, a tau YZ stress and a diagonal Qxy in-plane interfacial stress, such that the configuration comprises:
- a trapezoidal planform shape; and
- a plurality of concentric regions, such that a value for a tensile modulus for each region in the plurality of regions reduces progressively for each region located radially further from a center of an innermost region of the plurality of regions.

18. The rework patch of claim 17, further comprising the tensile modulus for the innermost region comprising a value in a range from 35-38 million pounds per square inch.

19. The rework patch of claim 17, further configured comprising a ratio of a shorter base to a longer base, of the trapezoidal planform shape, such that as the ratio of the shorter base to the longer base increases, a stress intensity at an edge of the inconsistency, covered by the rework patch, decreases.

20. The rework patch of claim 17, further configured comprising a ratio of a shorter base to a longer base, of the trapezoidal planform shape, such that as the ratio of the shorter base to the longer base increases, a strain energy release rate at the inconsistency, covered by the rework patch, decreases.

21. The rework patch of claim 17, further configured such that a value for a strain elongation for each region reduces progressively for each region located radially further from the center of the innermost region of the rework patch.

\* \* \* \* \*